United States Patent [19]
Wilson et al.

[11] Patent Number: 5,827,355
[45] Date of Patent: Oct. 27, 1998

[54] CARBON FIBER COMPOSITE MOLECULAR SIEVE ELECTRICALLY REGENERABLE AIR FILTER MEDIA

[75] Inventors: Kirk A. Wilson, Knoxville; Timothy D. Burchell, Oak Ridge; Roddie R. Judkins, Knoxville, all of Tenn.

[73] Assignee: Lockheed Martin Energy Research Corporation, Oak Ridge, Tenn.

[21] Appl. No.: 792,560

[22] Filed: Jan. 31, 1997

[51] Int. Cl.⁶ .................................................. B01D 53/04
[52] U.S. Cl. ............................... 95/114; 95/116; 95/141; 95/148; 95/903; 95/143; 55/527
[58] Field of Search ............................ 95/90, 114–116, 95/136, 139, 148; 96/108, 121, 126–128, 130, 143, 146; 55/527

[56] References Cited

U.S. PATENT DOCUMENTS

| | | | |
|---|---|---|---|
| 3,608,273 | 9/1971 | Fabuss et al. | 95/148 |
| 3,727,375 | 4/1973 | Wallace | 95/139 X |
| 3,768,232 | 10/1973 | Farber et al. | 96/106 |
| 4,038,050 | 7/1977 | Lowther | 95/1 |
| 4,094,652 | 6/1978 | Lowther | 95/121 X |
| 4,101,296 | 7/1978 | Lowther | 95/148 X |
| 4,734,394 | 3/1988 | Kosaka et al. | 55/527 X |
| 4,737,164 | 4/1988 | Sarkkinen | 95/68 |
| 4,790,859 | 12/1988 | Marumo et al. | 95/138 |
| 5,080,963 | 1/1992 | Tatarchuk et al. | 428/225 |
| 5,091,164 | 2/1992 | Takabatake | 423/445 |
| 5,230,960 | 7/1993 | Iizuka | 428/902 X |
| 5,308,457 | 5/1994 | Dalla Betta et al. | 204/131 |
| 5,411,577 | 5/1995 | Moreau et al. | 95/138 X |
| 5,446,005 | 8/1995 | Endo | 502/433 |
| 5,482,538 | 1/1996 | Becker et al. | 95/148 X |
| 5,505,825 | 4/1996 | Gold et al. | 95/126 |

FOREIGN PATENT DOCUMENTS

| | | | |
|---|---|---|---|
| 2659869 | 9/1991 | France | 95/148 |

OTHER PUBLICATIONS

R. V. Jasra et al. "Separation of Gases by Pressure Swing Adsorption" *Separation Science and Technology*, vol. 26, pp. 885–930 (1991).

G. C. Wei et al. "Development and Characterization of CBCF Insulation for Radiosotope Space Power Systems," ORNL/TM –9381 (1985).

T. D. Burchell et al. "The effect of Neutron Irradiation on the Structure and Properties of Carbon–Carbon Composite Materials" Effects of Radiation on Materials: 16th International Symposium, ASTM STP 1175, Arvind S. Kumar, David S. Gelles, and Randy K. Nanstad, Eds. American Society for Testing of Materials, Philadelphia, 1993.

M. W. Thwaites et al. "Systhesis and Characterization of Activated Pitch–Based Carbon Fibers," *Fuel Processing Technology*, to be published (1993).

*Primary Examiner*—Robert Spitzer
*Attorney, Agent, or Firm*—J. Kenneth Davis

[57] ABSTRACT

An electrically regenerable gas filter system includes a carbon fiber composite molecular sieve (CFCMS) filter medium. After a separate medium-efficiency pre-filter removes particulate from the supply airstream, the CFCMS filter sorbs gaseous air pollutants before the air is recirculated to the space. When saturated, the CFCMS media is regenerated utilizing a low-voltage current that is caused to pass through the filter medium.

8 Claims, 3 Drawing Sheets

CARBON FIBER COMPOSITE MOLECULAR SIEVE ELECTRICALLY REGENERABLE AIR FILTER MEDIA

The United States Government has rights in this invention pursuant to contract no. DE-AC05-84OR21400 between the United States Department of Energy and Lockheed Martin Energy Systems, Inc. and contract no. DE-AC05-96OR22464 between the United States Department of Energy and Lockheed Martin Energy Research Corporation.

CROSS-REFERENCE TO RELATED APPLICATIONS

This invention is related to the invention described in the patent application entitled *Method and Apparatus for Separating Gases Based on Electrically and Magnetically Enhanced Monolithic Carbon Fiber Composite Sorbents*, Docket No. ERID 0065, filed on even date herewith.

Please refer to T. D. Burchell et al., U.S. patent application Ser. No. 08/747,109, filed Nov. 8, 1996 entitled *Activated Carbon Fiber Composite Materal and Method of Making* which is a Continuation in Part of U.S. patent application Ser. No. 08/358,857. The entire disclosure of U.S. patent application Ser. No. 08/747,109 is herein incorporated by reference.

Please further refer to R. R. Judkins and T. D. Burchell, U.S. patent application Ser. No. 08/601,672, filed Feb. 15, 1996, the entire disclosure of which is incorporated herein by reference.

FIELD OF THE INVENTION

The present invention relates to sorption type gas/air filters, and more particularly to those which employ carbon fiber composite molecular sieve (CFCMS) air filter media.

BACKGROUND OF THE INVENTION

Current technologies for removing gaseous air pollutants from residential, commercial, and industrial environments utilize sorbents such as granular activated carbons and high-surface area aluminas. When sorbents become saturated, they are removed from service for recycling (pressure/temperature swing method) or for waste disposal. The effective life of each sorbent depends on both the amount of pollutant captured and the sorptive capacity of that material.

High service-cycle costs have limited the implementation of many technologies for air quality improvements as in the case of activated carbon systems. Major technical and operating problems associated with granular sorbents include channeling, settling (packing), and resistance to air flow. With new standards for indoor air quality, American National Standards Institute (ANSI)/American Society of Heating, Refrigeration, and Air Conditioning Engineers (ASHRAE) 62-1989R, driving the application of cost-effective systems, lower life cycle and service cycle costs are needed to meet the demands of rapidly growing residential and commercial markets.

Gas separation, waste treatment, and catalyst supports are common industrial uses for active carbons. Settling, channeling, and pressure loss during operation are major problems associated with typical granular activated carbons. A process has been developed to produce a porous carbon fiber carbon composite with a density less than 0.2 g/cc. This structurally rigid composite can be activated to produce a significant volume of mesopores (2 to 50 nm) and/or micropores (<2 nm). Furthermore, the rigid structure has macropores in the range of 10–500 microns which allow for excellent fluid flow through the sample, resulting in an acceptable pressure drop. The rigid nature of the composite also eliminates problems due to channeling and settling, therefore making it a possible candidate for a catalyst support. The material has a continuous carbon structure and is thus electrically conductive. The passage of electric current, typically 1–20 amps at 1–5 volts for a small segment of media, causes the carbon fiber composite molecular sieve to heat, thus electrically and thermally desorbing sorbed gases.

Carbon fibers are produced commercially from rayon, phenolics, polyacrylonitrile (PAN), or pitch. The latter type are further divided into fiber produced from isotropic pitch precursors, and those derived from pitch that has been pretreated to introduce a high concentration of carbonaceous mesophase. High performance fibers, i.e. those with high strength or stiffness, are generally produced for PAN or mesophase pitches. Lower performance, general purpose fibers are produced from isotropic pitch precursors. These materials are produced as short, blown fibers (rather that continuous filaments) from precursors such as ethylene cracker tart coal tar pitch, and petroleum pitch prepared from decant oils produced by fluidized catalytic cracking. Applications of isotropic fibers include: friction materials; reinforcements for engineering plastics; electrically conductive fillers for polymers; filter media; paper and panels; hybrid yarns; and as a reinforcement for concrete.

More recently, interest has developed in activated forms of isotropic carbon fibers, where high surface areas can be produced by partial gasification in steam or other oxidizing gases. Activated carbon fibers have novel properties that make them more attractive than conventional forms (powders or large-size carbons) for certain applications. While porosity can be generated in most types of carbon fiber, low modulus fiber produced from isotropic pitch are particularly suited for activation because of their unique structure, where the random packing of small crystallites allows the development of an extensive pore structure.

Among the possible applications, activated carbon fibers are of interest for the adsorption and recovery of organic vapors; in environmental protection; the removal of $SO_x$ and $NO_x$ from flue gas; the improvement of air quality; and water treatment. Difficulties in handling and utilizing activated carbon fibers can be surmounted by their incorporation into composites, such as woven and non-woven fabrics, felt and paper. This invention provides a rigid, activated carbon fiber composite material that has an open and permeable structure and can be produced in single pieces to a given size and shape. The unique properties of the activated composite made from isotropic pitch derived carbon fibers, such as; narrow, unimodal pore structure in the fiber, high-surface area, rapid rates of adsorption and desorption, the ability to form specific shapes of high permeability and strength, suggest that, among other applications (notably in environmental protection), they may be suitable for molecular separation on the basis of size and shape.

Pressure swing adsorption (PSA) is a known process for separation of gases from multicomponent gas mixtures. The PSA apparatus relies on the physical process of adsorption, in which gases are selectively adsorbed onto a substrate from a gas stream, thus depleting the stream of one gaseous species. The adsorbed gas is then desorbed at a lower pressure into a second gas stream thus enriching it with the desorbed species. The desorption step regenerates the adsorbent material for reuse during the subsequent adsorption step. It is widely acknowledged that PSA technology has fully matured and that further advances in this technology will require the development of superior adsorbent and molecular sieve materials which have significantly higher surface areas combined with mean micropore width of 5–10 Å.

PSA systems typically comprise several adsorption beds, through which the gas stream is passed, allowing for the near complete separation of the selected gas species. The adsorbent materials used in a PSA unit are selected to have the appropriate mean micropore width (typically in the range of 5–10 Å) to selectively adsorb or sieve the required gas species and additionally must possess large surface areas. Currently available adsorbent materials include zeolites, with surface areas in the range of 10–350 $m^2/g$, and activated carbons with surface areas in the range of 500–1000 $m^2/g$. Conventional activated carbons and carbon molecular sieves are granular in structure. During operation in a PSA system, granular materials suffer attrition and can settle resulting in the formation of channels which allow the fluid stream to bypass the adsorbent.

OBJECTS OF THE INVENTION

Accordingly, objects of the present invention include the provision of a new and improved regenerable air/gas filter which reduces operating costs of gaseous air filtration systems by providing superior sorption capacity and on-site regeneration.

The carbon fiber composite material of the present invention is comprised of porous carbon fibers bonded to form a monolithic, open and permeable structure. The carbon fiber composite defines surface areas greater than 1000 $m^2/g$. Several characteristics of the carbon fiber composite can be altered by altering selected conditions during the production and activation of the composite.

Further and other objects of the present invention will become apparent from the description contained herein.

SUMMARY OF THE INVENTION

In accordance with one aspect of the present invention, the foregoing and other objects are achieved by an electrically regenerable gas filter apparatus which comprises: a carbon fiber composite molecular sieve filter medium for sorbing pollutants from unacceptable gas flowing thereinto and permitting an acceptable gas to flow therefrom; and a regenerating means for causing an electrical current to pass through the filter medium to desorb sorbed pollutants from the filter medium.

In accordance with a second aspect of the present invention, the foregoing and other objects are achieved by an electrically regenerable gas filter method for removing pollutants from unacceptable gas which comprises the steps of: providing a carbon fiber composite molecular sieve filter medium; passing the polluted gas through the filter medium to sorb the pollutants from the gas onto the filter medium and to pass acceptable gas therefrom; and passing an electrical current through the filter medium to desorb sorbed pollutants from the filter medium.

BRIEF DESCRIPTION OF THE DRAWINGS

In a more specific embodiment.

FIG. 2 is a schematic sectional view showing the air conditioning or heat-pump unit mounted against the wall of a room. Arrows show air flow through the apparatus in the normal operational mode.

FIG. 3 is a schematic sectional view of the same embodiment as FIG. 2. Arrows show air flow through the apparatus in the cleaning or purge mode.

Figure 1:
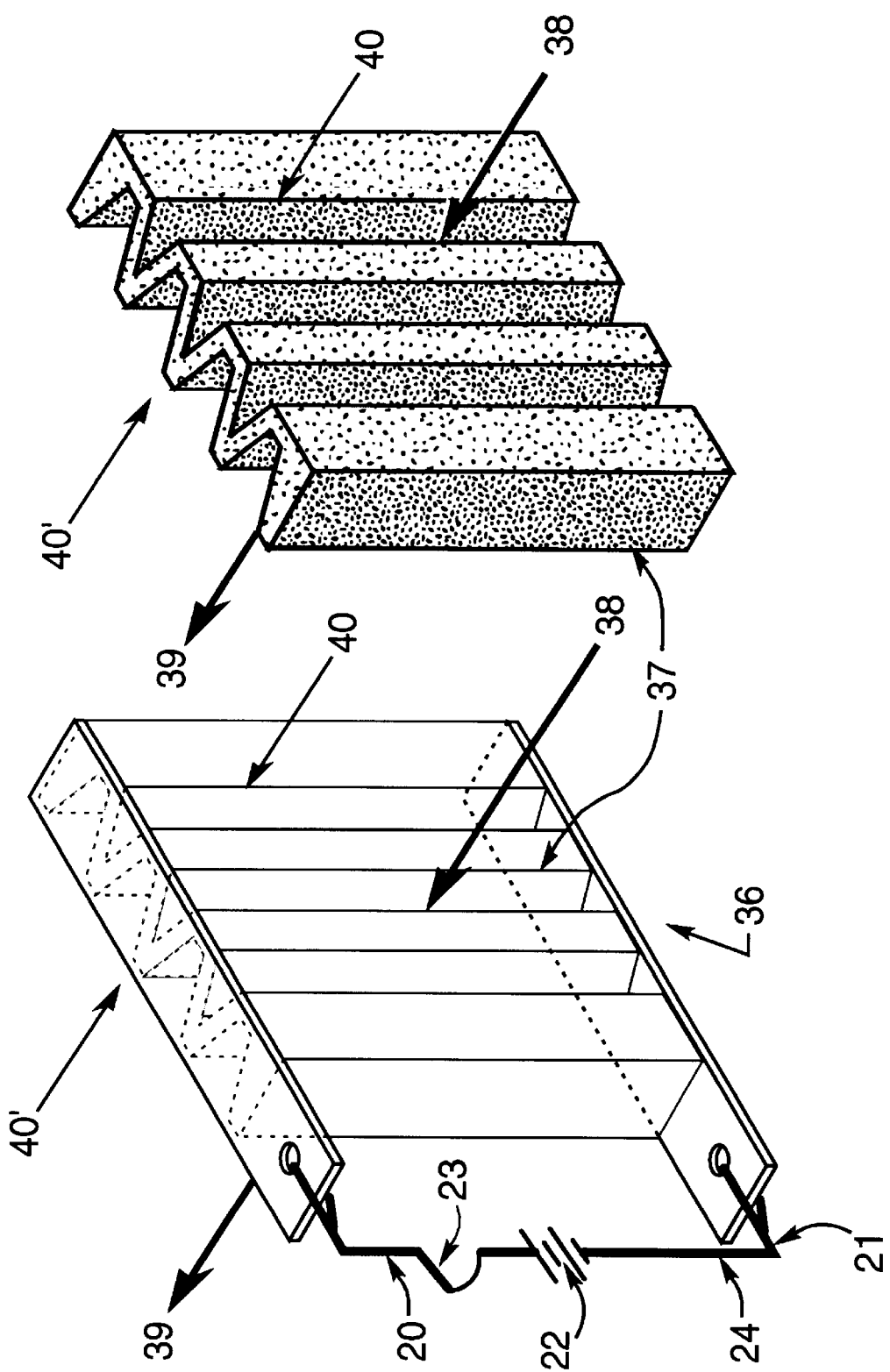
FIG. 1 is a schematic view showing the carbon filter 36 further comprising a carbon fiber composite molecular sieve medium 37; unacceptable air 38; filtered to acceptable air 39; and purge or scavenger air 40 and 40' to remove contaminants; and a regenerating means 20 whereby an electrical current may be caused to pass through the filter medium to desorb sorbed pollutants from the filter medium. In a preferred embodiment the regenerating means 20 further comprises an electrical circuit 21 further comprising a power supply 22, switching means 23, and electrical conductors 24.
Figure 2:
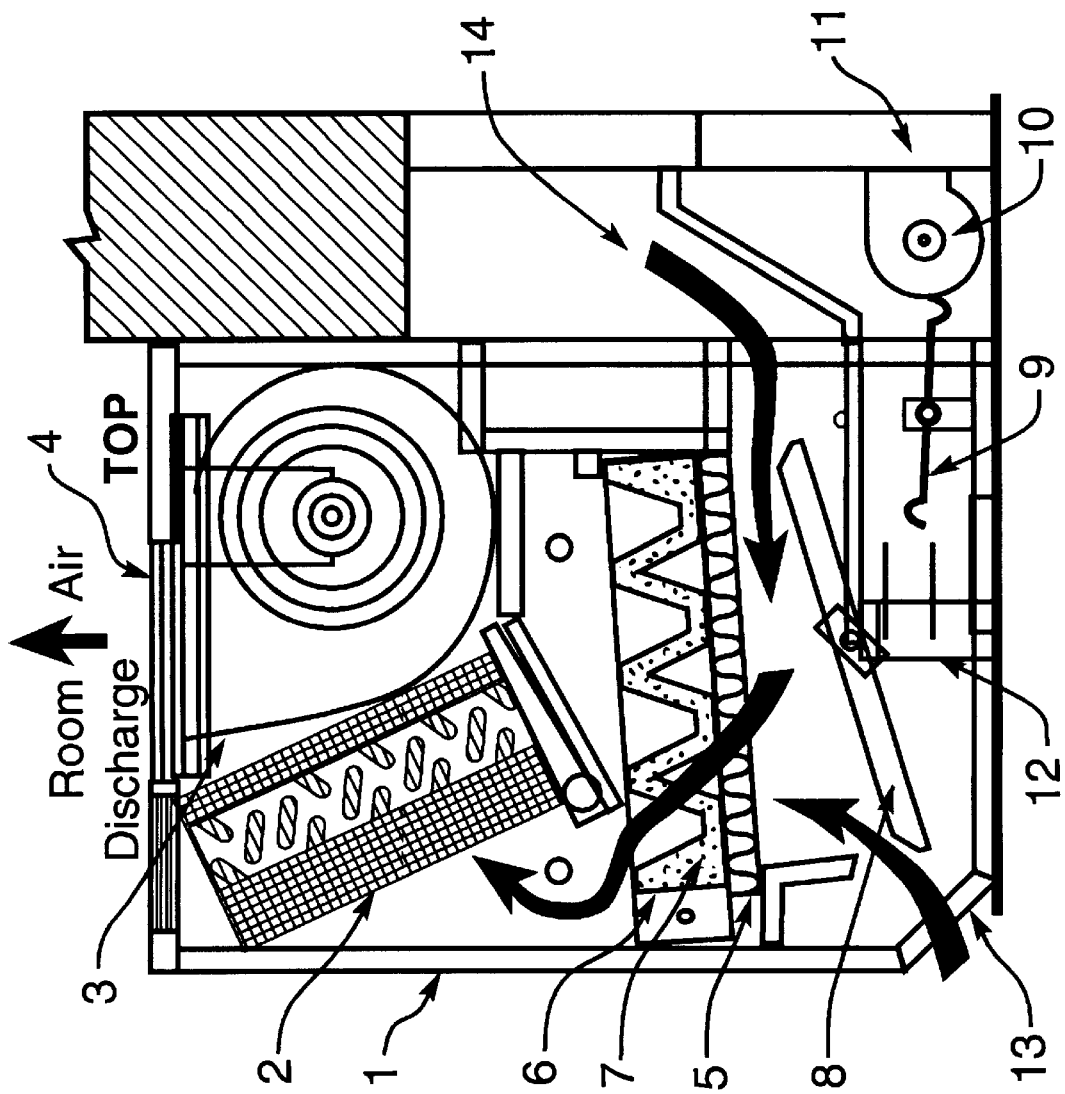
FIGS. 2 and 3 show a heat pump or air conditioner apparatus which comprises a case 1 containing a heat transfer coil assembly 2, a room air blower assembly 3 with a room air discharge 4, a conventional particulate air filter 5, a carbon filter 6 further comprising a carbon fiber composite molecular sieve medium 7, an outside air and return air damper 8, an exhaust air damper 9, an exhaust air blower 10 having an exhaust air discharge 11, an exhaust air back draft damper 12, a return air inlet 13, an outside air inlet 14, and associated ductwork well known to one of skill in the art.
Figure 3:
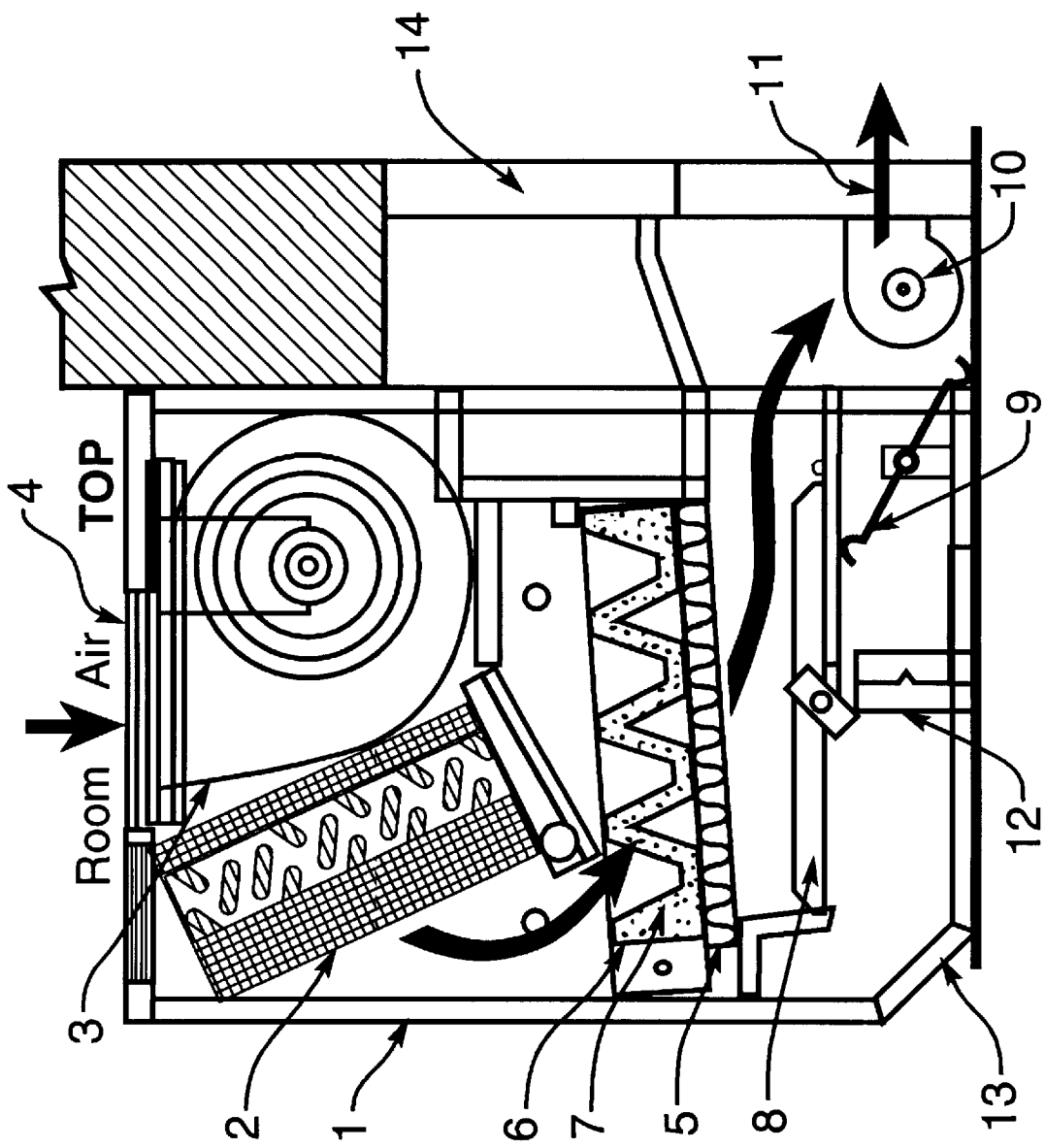

For a better understanding of the present invention, together with other and further objects, advantages and capabilities thereof, reference is made to the following disclosure and appended claims in connection with the above-described drawings.

DETAILED DESCRIPTION OF THE INVENTION

Carbon fiber composite molecular sieve (CFCMS) air filter media is a semi-permanent activated carbon media which efficiently removes many organic and inorganic gaseous air pollutants from an airstream. The media can be installed in existing or new filter banks of industrial, institutional, commercial and residential air handling and/or exhaust systems.

Pollutants that are generally known to contribute to unacceptable indoor and/or outdoor air quality (toxic, odor, irritant, material damage) are targeted for removal by sorption. Inorganic pollutants include ozone, radon, and carbon monoxide. Organic pollutant families include n-alkanes, chlorinated hydrocarbons, ethers, aldehydes, and aromatic hydrocarbons, and various hydrogen compounds. Here we define unacceptable air as air not meeting the air purity requirements of ASHRAE 62.

When the CFCMS media is saturated with pollutant, a low voltage current is applied through the carbon fibers which causes heating and desorption of sorbed pollutants from the fibers into the surrounding purge air thereby regenerating the media. Regeneration can be performed on-site, either inside the filter bank or externally.

After a separate medium-efficiency pre-filter removes particulate from the supply airstream, the CFCMS filter sorbs gaseous air pollutants before the air is recirculated to the space or exhausted. When saturated, the CFCMS media is regenerated on-site (either inside the filter rack or externally) utilizing a low-voltage current that is caused to pass through the filter medium. The voltage is normally less than about 150 volts AC or DC. Preferred voltage and current depends upon geometry and size of the CFCMS media, but in a preferred embodiment would cause heating to a temperature sufficient to desorb sorbed pollutants, typically 50° C. to 500° C. The pollutants are thermally desorbed from the CFCMS media and become airborne in the surrounding purge air which transports the pollutant to exhaust or disposal either through natural or forced air dispersion. A damper mechanism may facilitate the flow of air through the filter bank to atmosphere or to exhaust for disposal during the regeneration phase.

The subject CFCMS filter media is useful in efforts to meet new, more stringent air quality standards in an economically justifiable fashion and avoid disposal problems associated with spent carbon. Uniquely, the CFCMS filter media is suitable for installation as a semi-permanent filter with on-site (in-place or external) regeneration.

The CFCMS filter media can be manufactured to fit most standard filter housings for both retrofit and new construction applications. Equipment for providing the necessary electrical current for regeneration and trapping of desorbed pollutants is well-known to the skilled artisan.

Carbon fibers used to fabricate the CFCMS filter media can be impregnated with other, conventional sorbents to enable pollutant-specific sorption or treated/impregnated to enhance sorption of nuclear, biological, and chemical (NBC) challenge gases, well-known as battlefield threats to military personnel. Moreover, the CFCMS can be tailored through judicious selection of carbon filter types, fabrication process parameters and activation conditions to meet specific sorptive challenges. Acid gases and alkaline gases are examples of pollutants that may require special additives for sorption.

Air quality applications for the present invention include residential, vehicle, industrial, business, and military (nuclear, biological, and chemical).

The CFCMS is especially useful in the air quality applications because: the low concentrations of gaseous pollutants generally experienced requires high performance sorbers; the families of gaseous pollutants involved are easily sorbed; semi-permanent filter media configuration reduces life cycle costs; on-site electrical/thermal regeneration prevents costly downtime; and the filtration system is adaptable both to retrofit and new construction.

A novel carbon fiber composite material and a method for making is described herein. The carbon fiber composite material is designed to controlled porosity. Moreover, the carbon fiber composite material defines a rigid, open, monolithic structure with high permeability.

The carbon fiber composite of the present invention is comprised generally of carbon fibers and a binder. The composite is strong and porous allowing fluids to easily flow through the material. At the same time, when activated, the carbon fibers provide a porous structure for adsorption.

Synthesis of the carbon fiber composite is generally comprised of mixing a selected carbon fiber in a water slurry with a carbonizable organic powder. The desired monolith configuration is molded from the slurry. The resulting green form is dried and removed from the mold. The composite is cured prior to carbonization under an inert gas. Once carbonized the composite is readily machined to the desired final configuration. The composite material is then activated to develop the fibers pore structure.

The fiber or fibers selected will depend upon the ultimate use of the resultant composite. The process described herein will focus on the production of a carbon fiber composite for use as a molecular sieve.

For use as an adsorbent or molecular sieve, it is preferable to use carbon fibers derived from a suitable isotropic pitch precursor.

The manufacture of pitch based fibers is well known in the art and is briefly described herein. Pitch is conventionally derived from a heavy petroleum fraction. Fiber forming methods include melt spinning and melt blowing. During both of these processes, the pitch is melted to a carefully controlled viscosity then forced through a number of fine capillaries to produce fibers as the pitch resolidifies. In the melt spinning process the fiber diameter is controlled by drawing the fibers down and winding them onto a reel as they form. The melt blowing process employs a stream of air which draws the fibers down as it blows them onto a moving belt to form a random mat of "green" pitch fibers. In both methods, extreme care must be taken to control the temperature and other conditions. Once formed, the green fibers are "stabilized", by heating the fibers in an oxidizing atmosphere, so that they are rendered thermosetting and will retain their fibrous form at the high temperatures used in the subsequent carbonization step. After carbonization, the fiber mats contain about 95% carbon by weight.

In the preferred embodiment, the isotropic pitch precursor is formed such that the resultant fibers define a diameter of approximately 10–25 $\mu$m. The fibers can be in a stabilized or carbonized condition. The fibers are cut to a selected size. For the preferred embodiment, it is preferable to cut the fibers to an average length of approximately 400 $\mu$m, and can range from 100 to 1000 $\mu$m.

The chopped carbon fibers are mixed in a water slurry with a carbonizable organic powder, such as pitch, thermosetting resin or phenolic resin. In the preferred embodiment, powdered phenolic resin is utilized.

The preferred forming method is vacuum molding, where the slurry is transferred to a molding tank and the water is drawn through a porous mold under vacuum. The material can be molded into any configuration desired such as a cylinder or plate. Obviously, the configuration will be determined by the configuration of the mold into which the slurry is transferred. Other methods of forming can be utilized such as pressure forming or various forming methods practiced in the plastics industry.

The resulting green form is dried. In the preferred embodiment, the form is dried in air at 50° C. Once dried, the form is removed from the mold.

The dried green form is then cured to produce a cured monolith. In the preferred embodiment, the composite is cured at approximately 130° C. in air. The resulting composite is carbonized under an inert gas. Preferably, the composite is carbonized for 3 hours under nitrogen at 650° C. to pyrolize the resin binder.

The composite formed by the above process defines voids between the fibers (interfiber pores) which allow free flow of fluid through the material and ready access to the carbon fiber surface. The voids range from 10–500 $\mu$m in size. Further, the individual carbon fibers are held in place by the pyrolized resin binder and thus cannot move or settle due to the flow of gases through the material. The carbonized bulk density of the composite material is typically 0.3–0.4 g/cm$^3$. Assuming a theoretical density of 2.26 g/cm$^3$ (density of a single crystal pure graphite) for the composite of the present invention, at a density of 0.3–0.4 g/cm$^3$, the composite would range from approximately 82–86% porosity.

Following its manufacture, the monolithic carbon fiber composite is activated. Activation of the carbon fibers is accomplished by steam, carbon dioxide, oxygen or chemical activation. The resulting chemical reactions remove carbon and develop pores in the carbon fibers, which are classified by diameter: micropores (less than 2 nm), mesopores (2–50 nm) and macropores (greater than 50 nm).

In the preferred embodiment, the composite is steam activated in a steam/nitrogen atmosphere. The preferred activation conditions are: 800°–950° C., steam at a partial pressure of 0.1–0.9 atmospheres and for durations of 1–3 hours. Burn off is calculated from the initial and final weights. Up to approximately 60% burn off, the surface area increases with burn off. The main concern with a higher burn off is the reduction in the strength of the composite. Using the manufacturing process described herein, the reduction of crush strength of the composite is almost linear with burn-off, rather than the strong exponential dependance more typically exhibited by thermally oxidized carbons. At 56% burn-off, the BET $N_2$ surface area was 1670 $m^2/g$. A crush strength of approximately 1 MPa is retained after activation. The resultant fibers in the composite define a high micropore volume, a low mesopore volume and no macropores.

The activation conditions can be varied by changing the activation gas, its concentration, the flow rate, the temperature and the optional presence of a catalyst to influence total surface area and pore size distribution. Further, the use of post activation treatments can be implemented. For example, further heating or the introduction of chemicals could affect the pore size distribution and surface chemistry.

Once carbonized or activated, the composite can be machined to any desired shape, forming a monolithic carbon fiber composite.

The resultant activated carbon fiber composite is ideal for use as an adsorbent or molecular sieve in the Pressure Swing Adsorption (PSA) process. It has a very high surface area, a narrow micropore distribution centered around mean pore widths of 5–10 Å, a high micropore volume, low mesopore volume, a high gas adsorption/desorption rate, and a permeable macrostructure through which fluid can easily pass. Further, because the carbon fiber composite is a monolith, it overcomes the settling problems associated with beds of granular activated carbon and carbon molecular sieves and thus bypass flows and pressure drops are eliminated. Moreover, the mean micropore size is controllable through the activation process thus allowing for the carbon fiber composite to be tailored for adsorption or sieving of specific gas molecules. The density and void size of the carbon fiber composite can be altered by varying the fiber length, binder content and molding conditions. The most likely initial applications are in the field of gas separations.

Although use of the carbon fiber composite as an adsorbent in the PSA process has been emphasized, with variations to process described above, there are several alternative uses. Carbon fibers derived from coal tar pitch, rayon, polyacrylonitrile (PAN) or heavy oils such as oil shale residue and refinery residue can be utilized in the production of the composite. Further, the fibers can be vapor grown. The fibers or a blend of different carbon fibers can be utilized to control the characteristics of the resultant carbon fiber composite. More specifically, the strength, thermal conductivity, pore size distribution, density and electrical properties are examples of the characteristics that can be modified or controlled with the appropriate carbon fiber or blend of carbon fibers.

By selecting a different carbon fiber and altering selected parameters in the production process, the carbon fiber composite can be modified for use in a variety of applications. For example, the carbon fiber composite can be utilized in gas purification applications and specifically air purification, especially in confined spaces where the higher rates of adsorption on activated carbon fiber composites offers potential space savings. Further, a composite with a bulk density greater than 1 $gm/cm^3$ and an active surface area greater than 1000 $m^2/g$ can be utilized for gas storage. For example, the composite could be utilized as a $CH_4$ or $H_2$ storage medium or as a $CH_4$ purification medium for $CH_4$ from various sources, including land fill gases or coal bed gas. Further, a mesoporous carbon fiber composite is suitable for use in a liquid phase applications or as a catalyst support.

From the foregoing description, it will be recognized by those skilled in the art that a carbon fiber composite, and a method for making offering advantages over the prior art has been provided. Specifically, the carbon fibers in the composite provides a high surface area and is in a rigid, permeable, monolithic form.

While there have been shown and described what are at present considered the preferred embodiments of the invention, it will be obvious to those skilled in the art that various changes and modifications can be made therein without departing from the scope of the inventions defined by the appended claims.

We claim:

1. An electrically regenerable gas filter method for removing pollutants from a polluted gas comprising the steps of:
   (A) Providing a carbon fiber composite molecular sieve medium comprising an activated carbon fiber composite material further comprising a multiplicity of porous carbon fibers bonded with a carbonizable organic binder to form an open, permeable structure, said composite defining a porosity in a range of approximately 82–86%;
   (B) Passing the polluted gas into said filter medium to sorb pollutants from the unacceptable gas onto said filter medium and to pass acceptable gas therefrom; and
   (C) Passing an electrical current through said filter medium to desorb sorbed pollutants from said filter medium.

2. The method of claim 1 further comprising an additional step of:
   (D) directing the desorbed pollutants away from the acceptable gas using a containment means.

3. The method of claim 2 wherein said containment means comprises at least one means selected from the group of means consisting of ducts, dampers, and fans.

4. The method of claim 2 further comprising the step of:
   (E) exhausting said desorbed pollutants from said containment means.

5. An electrically regenerable gas filter apparatus comprising:
   (A) a carbon fiber composite molecular sieve filter medium for sorbing pollutants from an unacceptable gas flowing thereinto and permitting an acceptable gas to flow therefrom comprising an activated carbon fiber composite material further comprising a multiplicity of porous carbon fibers bonded with a carbonizable organic binder to form an open, permeable structure, said composite defining a porosity in a range of approximately 82–86%; and
   (B) a regenerating means for causing an electrical current to pass through said filter medium to desorb sorbed pollutants from said filter medium.

6. The apparatus of claim 5 further comprising:
   (C) containment means for directing desorbed pollutants away from acceptable gas.

7. The apparatus of claim 6 wherein said containment means comprises at least one means selected from the group of means consisting of ducts, dampers, and fans.

8. The apparatus of claim 6 wherein said containment means comprises exhausting means for exhausting sorbed pollutants from said apparatus.

* * * * *